United States Patent [19]

Burton et al.

[11] 4,005,881
[45] Feb. 1, 1977

[54] RING SET BALL COUPLING

[75] Inventors: James A. Burton; Gerald A. Marsh, both of Houston, Tex.

[73] Assignee: HydroTech International, Inc., Houston, Tex.

[22] Filed: Aug. 6, 1975

[21] Appl. No.: 602,439

[52] U.S. Cl. .............................. 285/111; 285/93;
285/96; 285/113; 285/261; 285/270;
285/DIG. 18
[51] Int. Cl.² ...................................... F16L 27/06
[58] Field of Search ......... 285/261, 270, 403, 113,
285/111, DIG. 18, 342, 93, 96

[56] References Cited

UNITED STATES PATENTS

| | | | |
|---|---|---|---|
| 908,414 | 12/1908 | Mellin | 285/270 X |
| 1,193,483 | 8/1916 | Parker | 285/261 |
| 2,714,021 | 7/1955 | Froidevaux | 285/261 X |
| 3,134,613 | 5/1964 | Regan | 285/111 X |
| 3,185,504 | 5/1965 | Perrot et al. | 285/111 X |
| 3,873,138 | 3/1975 | Griffiths et al. | 285/403 X |
| 3,874,706 | 4/1975 | Arnold | 285/261 X |

FOREIGN PATENTS OR APPLICATIONS

| | | | |
|---|---|---|---|
| 858,170 | 12/1952 | Germany | 285/113 |
| 39,091 | 9/1936 | Netherlands | 285/342 |

*Primary Examiner*—Thomas F. Callaghan

[57] ABSTRACT

Apparatus for connecting the ends of two pipes comprising; a pair of coupling members, each of which is connected at one end thereof to the end of one of the pipes; one of the coupling members having attached to the other end thereof an annular spherically-shaped enlarged portion having axially forward and rearward sides; the other coupling member having attached to the other end thereof a housing having an internal surface for receiving the spherically-shaped forward side of said enlarged portion in mating engagement therewith, thereby enabling the central axes of the coupling members to be inclined at an angle relative to each other for connecting similarly inclined pipe ends; seal means disposed between the enlarged portion and the housing for providing a fluid seal therebetween; a plurality of cam members supported in circumferentially disposed relation about the housing and movable axially and radially inward towards the internal surface between a retracted position in which the housing freely receives the spherically-shaped forward side of the enlarged portion in mating engagement therewith, and an extended and locked position in which the cam members engage the spherically-shaped rearward side at a plurality of points circumferentially thereabout to urge the enlarged portion into positive contact with the housing to restrain the coupling members against relative axial separation; and means for moving the cam members towards the extended and locked position.

16 Claims, 6 Drawing Figures

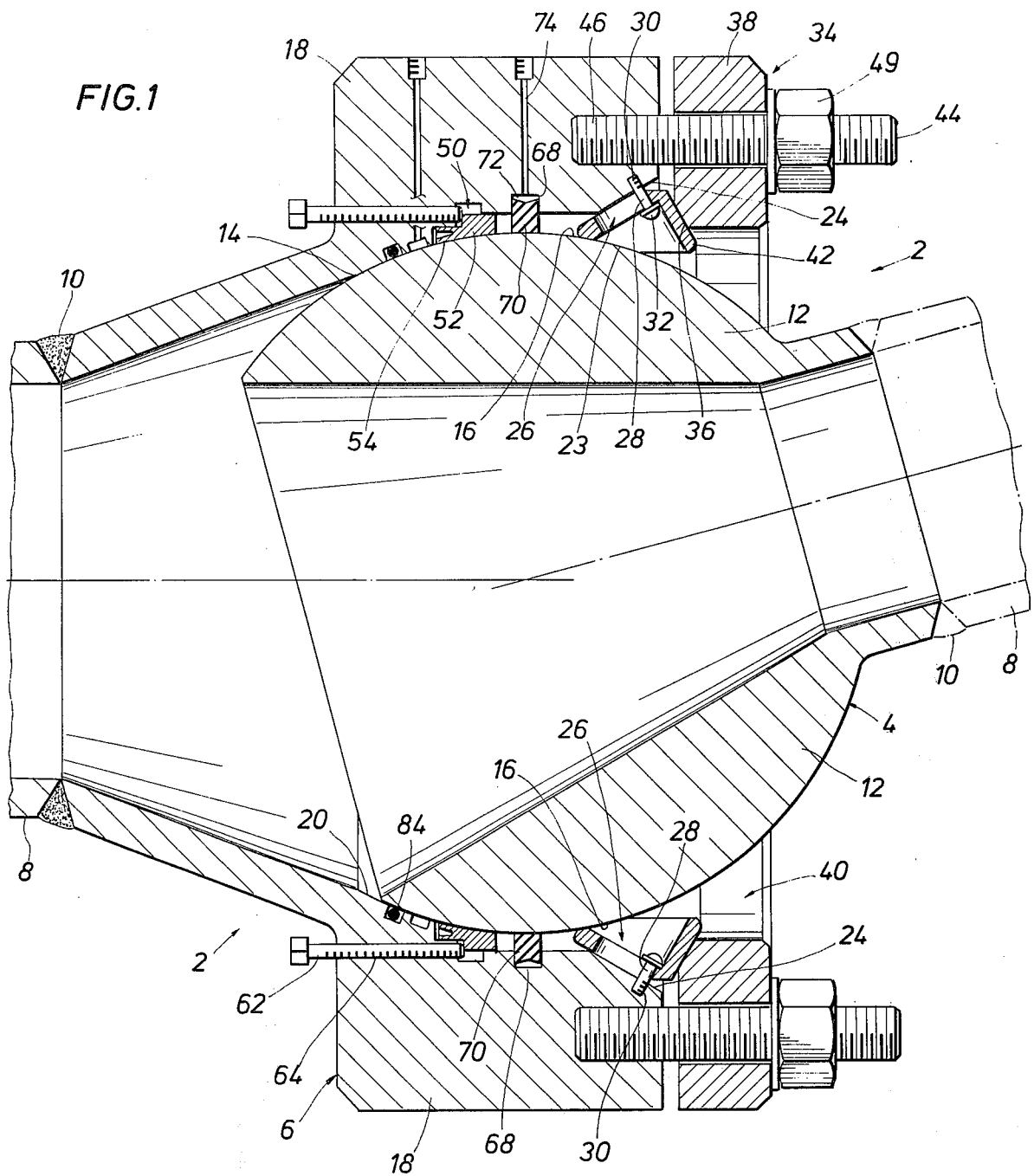
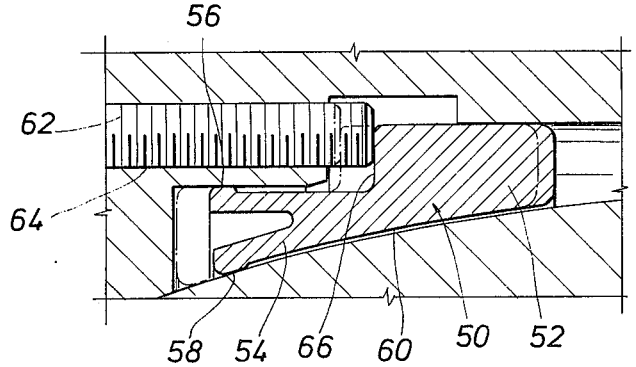

RING SET BALL COUPLING

BACKGROUND OF THE INVENTION a. Field of the Invention

The present invention relates broadly to a coupling of the ball and socket type for rigidly connecting together the ends of two pipes ordinarily located in a sub-sea environment. More particularly, the invention has regard to an improved coupling of this type which is capable of rigidly connecting together pipe ends which may be misaligned relative to each other.

b. Description of the Prior Art

Prior art ball and socket type couplings are used to connect misaligned pipe ends in a sub-sea environment where the socket includes jaws for engaging the rearward side of the ball to lock it within the socket. In many cases however, such couplings are flexible to permit universal movement between the pipe ends to accommodate wave action, for example. In other cases, the socket jaws take the form of a snap-ring, making it difficult to assemble the ball and socket together; this being a major shortcoming since working conditions in a sub-sea environment are substantially limited in terms of visibility, maneuverability and so forth. Moreover, other socket jaws cannot assume a retracted position to permit free entry of the ball within the socket, but instead must be separately attached to the socket after it receives the ball; this being a further shortcoming since the jaws are usually heavy and awkward to handle.

SUMMARY OF THE INVENTION

Accordingly, a broad object of the present invention is to overcome the aforementioned prior art shortcomings by providing an improved coupling of the ball and socket type which is capable of rigidly connecting together pipe ends which may be misaligned relative to each other.

Another object of the present invention is to provide a coupling having ball and socket coupling members which are easy to assemble to thereby constitute a quick connect coupling.

To achieve the foregoing and other obvious objects of the invention, both stated and unstated hereinafter, the invention provides apparatus for connecting the ends of two pipes comprising; a pair of coupling members, each of which is connected at one end thereof to the end of one of the pipes; one of the coupling members having attached to the other end thereof an annular spherically-shaped enlarged portion having axially forward and rearward sides; the other coupling member having attached to the other end thereof a housing having an internal surface for receiving the spherically-shaped forward side of the enlarged portion in mating engagement therewith, thereby enabling the central axes of the coupling members to be inclined at an angle relative to each other for connecting similarly inclined pipe ends; seal means disposed between the enlarged portion and the housing for providing a fluid seal therebetween; a plurality of cam members supported in circumferentially disposed relation about the housing and movable axially and radially inward towards the internal surface between a retracted position in which the housing freely receives the spherically-shaped forward side of the enlarged portion in mating engagement therewith, and an extended and locked position in which the cam members engage the spherically-shaped rearward side at a plurality of points circumferentially thereabout to urge the enlarged portion into positive contact with the housing to restrain the coupling members against relative axial separation, and means for moving the cam members towards the extended and locked position.

Other objects of the invention more or less broad that the foregoing will become apparent from the hereinafter following description of the elements, parts and principles of the invention given herein solely by way of example and with reference to the accompanying drawings wherein like reference numerals refer to like parts of the invention.

BRIEF DESCRIPTION OF THE DRAWINGS

FIG. 1 is a sectional view of the coupling members in an assembled and locked condition;

FIG. 2 is an enlarged fragmentary view of the seal means appearing in FIG. 1;

DESCRIPTION OF THE PREFERRED EMBODIMENT

Figure 3:
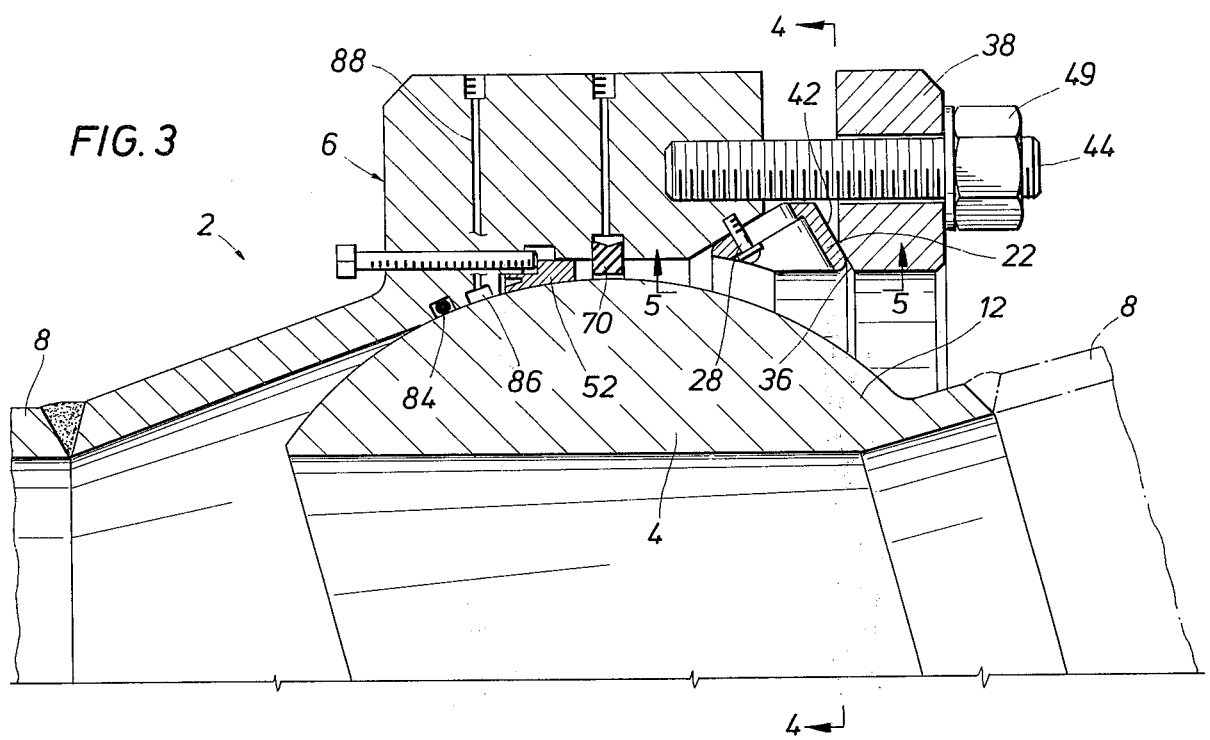
FIG. 3 is a sectional view of the coupling members in an assembled though unlocked condition.

The preferred embodiment of the coupling apparatus for connecting together the ends of two pipes according to the present invention is illustrated generally in FIG. 1. Therein appears coupling 2 which includes a pair of coupling members 4 and 6, each of which is appropriately connected at one end thereof to the end of one of the pipes 8—8 as at 10. Coupling member 4 has attached to the other end thereof an annular spherically-shaped ball-like enlarged portion 12 having axially forward and rearward sides 14 and 16, respectively. Coupling member 6 on the other hand has attached to the other end thereof a socket or housing 18 having a spherically-shaped internal surface 20 for receiving the spherically-shaped forward side 14 in mating engagement therewith as shown in FIG. 1. Thus this ball and socket arrangement enables the central axes of coupling members 4 and 6 to be inclined at an angle relative to each other to thereby connect similarly inclined pipe ends as illustrated by the intersecting axes in FIG. 1.

It will be understood that forward and rearward sides 14 and 16 will include those spherically-shaped surface portions of enlarged portion 12 which are respectively engaged with internal surface 20 and the cam members (yet to be described) irrespective of any relative misalignment between coupling members 4 and 6.

Figure 4:
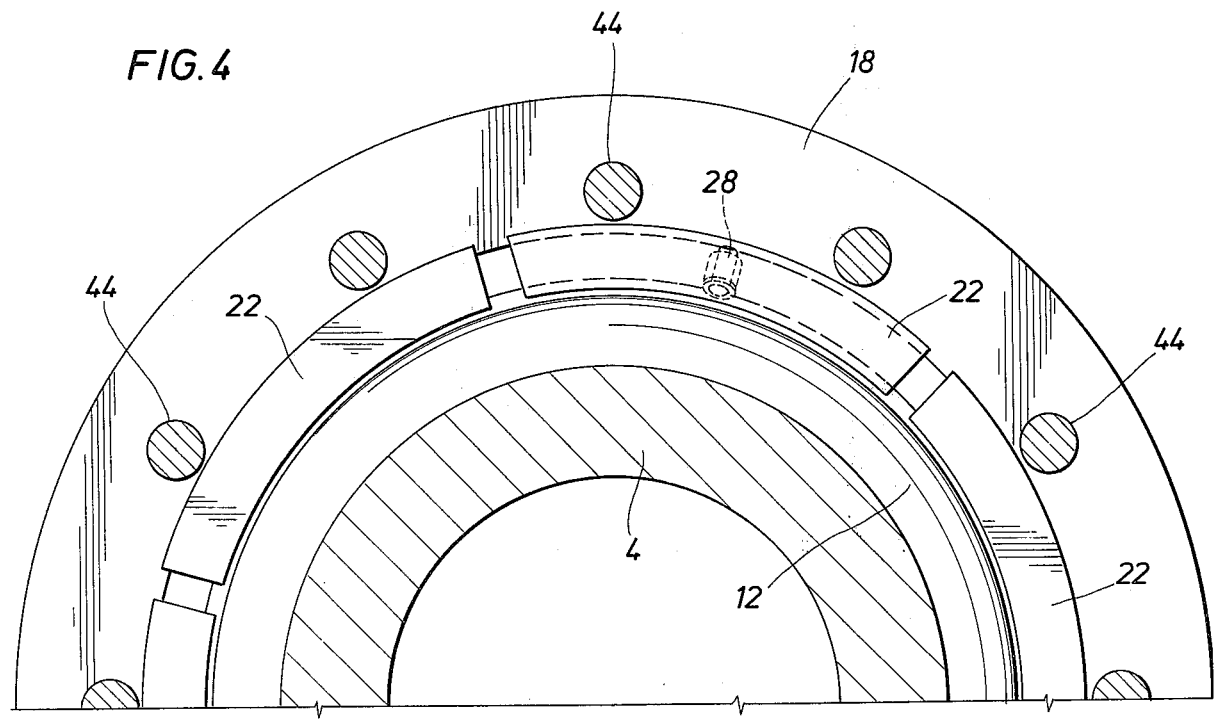
FIG. 4 is a front view of the assembled coupling members taken along line 4—4 of FIG. 3.
Figure 5:
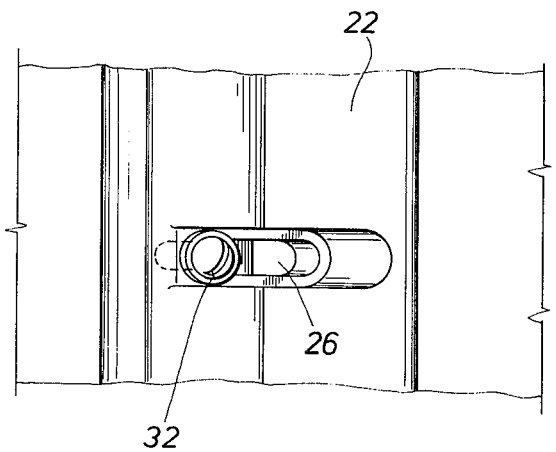
FIG. 5 is an enlarged fragmentary view of a cam member fastened to the housing and taken along line 5—5 of FIG. 3.

In addition, a plurality of jaws or cam members 22 (FIG. 1) are supported in circumferentially disposed relation about housing 18 as shown in FIG. 4 and movable radially inwards towards internal surface 20 between a retracted position (FIG. 3) in which housing 18 freely receives said spherically-shaped forward side 14 in mating engagement therewith, and an extended and locked position in which the ends 23 of cam members 22 engage said spherically-shaped rearward side 16 at a plurality of points circumferentially thereabout to urge enlarged portion 12 into positive contact with housing 18 to restrain coupling members 4 and 6 against relative axial and flexing movement to thus provide a rigid connection. More particularly, each cam member 22 is movable along a housing face 24 which tapers axially and radially inward towards internal surface 20 in the semblance of a frusto-cone and includes an elongated slot 26 (FIG. 5) in which is located a fastener 28 to support cam member 22 against housing face 24; cam member 22 being movable relative to fastener 28 between the retracted and extended positions aforesaid. Fastener 28 in turn is threaded into housing 18 as at 30 and includes a head 32 which is larger in width than the width of slot 26 for obvious reasons.

In addition, the invention visualizes means 34 for moving cam members 22 towards the extended and locked position aforesaid. More particularly, moving means 34 includes a biasing surface 36 which constitutes an inner face of an axially movable annular ring 38 mounted onto housing 18 and having an opening 40 sufficiently large to accommodate enlarged portion 12; said biasing surface 36 being tapered radially inward away from housing face 24 in the semblance of a frusto-cone. Biasing surface 36 in turn is engaged with a like tapered end 42 of each cam member 22 whereby when biasing surface 36 moves axially towards housing face 24 said cam members 22 will be moved radially inward from the retracted position of FIG. 3 to the extended position of FIG. 1. To procure axial movement of annular ring 38 moving means 34 includes in this embodiment of the invention a plurality of bolts 44 threaded at one end thereof into housing 18 as at 46 and extending at the other end thereof through a plurality of aligned holes 48 in annular ring 38. Nuts 49 are threaded onto bolts 44 to move annular ring 38 axially relative to housing 18 in an understood manner.

Thus it will be understood that with cam members 22 in the retracted position of FIG. 3 housing 18 is capable of freely receiving enlarged portion 12 through ring opening 40. Thereafter, nuts 48 are rotated to move ring 38 axially towards housing 18 with consequent radially inward movement of cam members 22 towards the extended position of FIG. 1. In the latter position it will be further understood that cam members 22 are also locked against movement by being wedged between housing face 24 and rearward side 16 to thereby provide a rigid connection.

The invention as visualized herein also includes seal means 50 disposed between enlarged portion 12 and housing 18 for providing a fluid seal therebetween. More particularly, seal means 50 includes an axially movable annular circumferentially continuous member 52 having a wedge-shaped portion 54 as best shown in FIG. 2 whereby when annular member 52 moves axially in one direction (in this case towards cam members 22) its wedge-shaped portion will become wedged between housing 18 as at 56 and enlarged portion 12 as at 58 to provide a fluid seal therebetween. Preferably, annular member 52 is formed of metal and includes an internal wall 60 which is spherically-shaped to correspond to the spherical contour of enlarged portion 12. To procure axial movement of annular member 52 the invention visualizes urging means in the form of a plurality of pins 62 threaded into and through openings 64 in housing 18. Pins 62 in turn are engaged with a shoulder 66 of annular member 52 to selectively move the latter from the dotted line position (FIG. 2) to the solid line position shown in the same view in which said annular member 52 is wedged between housing 18 and enlarged portion 12 as aforesaid.

An alternate embodiment of the seal means as visualized herein is illustrated generally in FIGS. 1 and 3. As shown therein, an annular groove 68 is provided in a wall of housing 18. Disposed snugly within groove 68 is an annular elastomeric member 70 which cooperates therewith to provide a sealed chamber 72, the latter communicating with a port 74 in housing 18 for introducing a pressurized fluid into chamber 72. Accordingly, it will be understood that when chamber 72 is pressurized elastomeric member 70 will be radially compressed from the disengaged position of FIG. 3 to the ball engaging position of FIG. 1 to effect a seal between enlarged portion 12 and housing 18.

Figure 6:
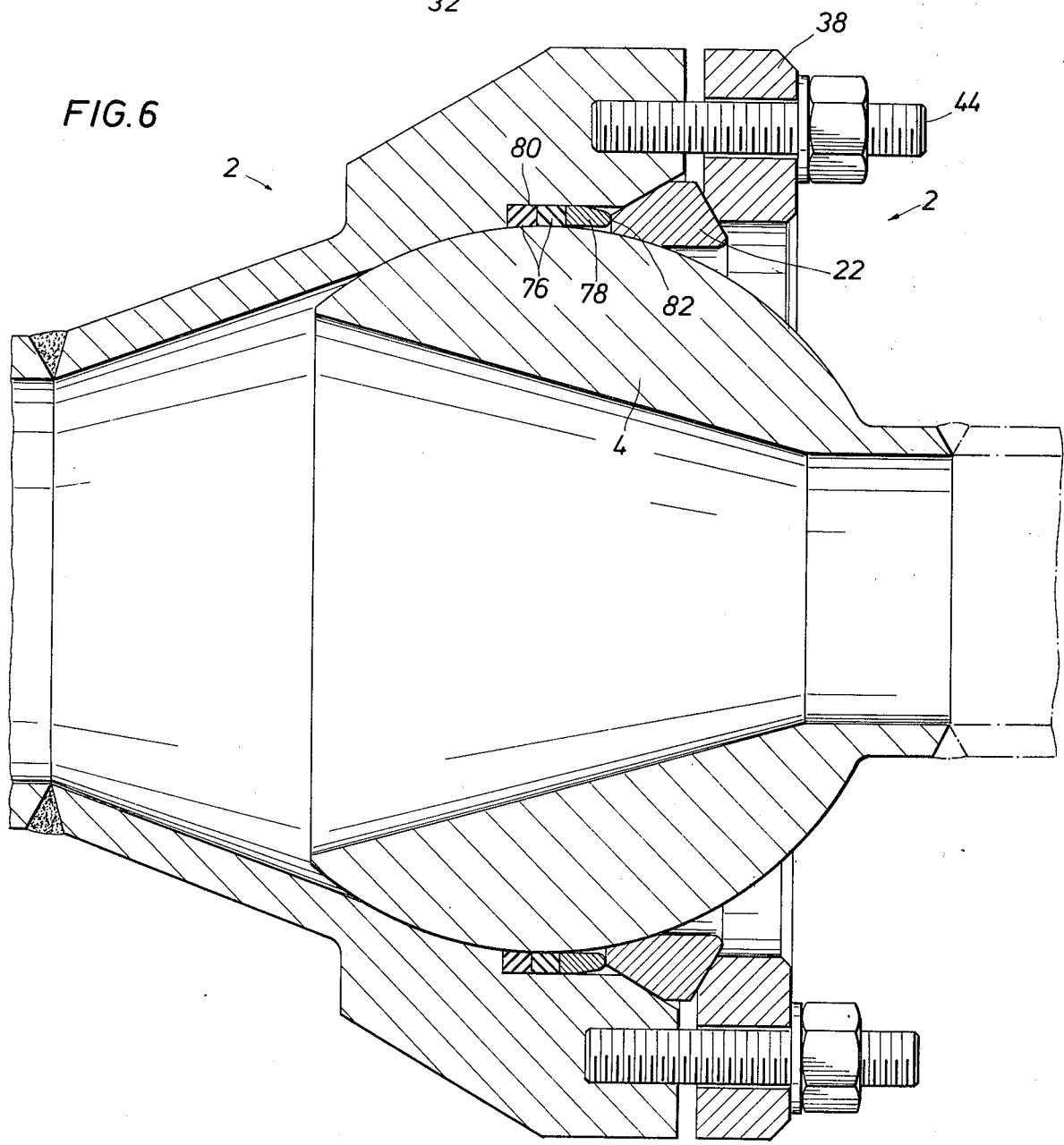
FIG. 6 is a sectional view of the coupling members utilizing an alternate embodiment of the seal means.

Another alternate embodiment of the seal means is shown in FIG. 6. Therein, annular elastomeric seal sections 76 and an annular rigid section 78 are shown held in a recess 80 within housing 18. Rigid section 78 is disposed to be engaged by cam members 22 as at 82 when the latter are in their extended position and thereby compares elastomeric seal sections 76 into sealing engagement with enlarged portion 12 as shown in FIG. 6.

To test the effectiveness of the seal means housing 18 includes an additional annular elastomeric seal section 84 disposed in axially spaced relation to the seal means to thereby define an annular testing chamber 86 therebetween as shown in FIGS. 1, 3 and 6. Conduit 88 is in communication with chamber 86 to introduce pressurized fluid thereinto to thereby test the effectiveness of the seal means in the known manner.

By way of brief summary therefore, the invention as visualized herein provides a ball and socket type coupling which is easy and quick to assemble to compensate for the rather limited working conditions that usually accompany pipe connections in a sub-sea environment. Moreover, this type coupling provides a rigid connection between the pipe ends while enabling them to be misaligned relative to each other if necessary.

What is claimed is:

1. Apparatus for connecting the ends of two pipes comprising;
    a pair of coupling members, each of which is connectible at one end thereof to the end of one of said pipes;
    one of said coupling members having attached to the other end thereof an annular spherically-shaped enlarged portion having axially forward and rearward sides;
    the other coupling member having attached to the other end thereof a housing having an internal surface for receiving the spherically-shaped forward side of said enlarged portion in mating engagement therewith, thereby enabling the central axes of the coupling members to be inclined at an angle relative to each other for connecting similarly inclined pipe ends;
    seal means disposable between said enlarged portion and said housing for providing a fluid seal therebetween;
    a plurality of cam members supported in circumferentially disposed relation about said housing and movable axially and radially inward towards said internal surface between a retracted position in which said housing freely receives the spherically-shaped forward side of said enlarged portion in mating engagement therewith, and an extended and locked position in which said cam members engage said spherically-shaped rearward side at a plurality of points circumferentially thereabout to urge said enlarged portion into positive contact with said housing to restrain said coupling members against relative axial separation;

and means for moving said cam members towards said extended and locked position.

2. Apparatus as defined in claim 1 wherein:
each said cam member is movable along a housing face which tapers axially and radially inward towards said internal surface.

3. Apparatus as defined in claim 2 wherein:
said housing face is frusto-conical.

4. Apparatus as defined in claim 2 wherein:
each said cam member includes an elongated slot in which is located a fastener to support said cam member against said housing face; said cam member being movable relative to said fastener between the retracted and extended positions aforesaid.

5. Apparatus as defined in claim 2 wherein:
said moving means includes a biasing surface engageable with said cam members, said biasing surface being tapered radially inward away from said housing face and movable axially relative thereto whereby when said biasing surface moves axially towards said housing face said cam members will be moved radially inward towards the extended position aforesaid.

6. Apparatus as defined in claim 5 wherein:
said biasing surface constitutes an inner face of an annular ring mounted onto said housing and movable axially relative thereto.

7. Apparatus as defined in claim 6 wherein:
said moving means includes a plurality of bolts tapped into said housing and extending through said annular ring for moving the latter relative to said housing as aforesaid.

8. Apparatus as defined in claim 6 wherein:
said biasing surface is frusto-conical.

9. Apparatus as defined in claim 6 wherein:
said annular ring includes an opening larger than said enlarged portion to permit said internal surface to receive said forward side as aforesaid.

10. Apparatus as defined in claim 1 wherein:
said seal means includes an axially movable annular member having a wedge-shaped portion whereby when said annular member moves axially in one direction said wedge-shaped portion will be wedged between said housing and said enlarged portion to provide a fluid seal therebetween as aforesaid.

11. Apparatus as defined in claim 10 wherein:
said annular member is formed of metal.

12. Apparatus as defined in claim 10 wherein:
said annular member includes an internal wall which is spherically-shaped to correspond to the spherical shape of said enlarged portion.

13. Apparatus as defined in claim 10 and further including:
means for urging said annular member towards the wedged position aforesaid.

14. Apparatus as defined in claim 13 wherein:
said urging means includes a plurality of pins threaded through openings in said housing; said pins being engageable with a shoulder of said annular member to selectively move the latter towards the wedged position aforesaid.

15. Apparatus as defined in claim 1 wherein:
said seal means is disposed in said housing to be engaged by each said cam member in said extended and locked position to thereby be compressed between said housing and said enlarged portion providing a fluid seal therebetween as aforesaid.

16. Apparatus as defined in claim 15 wherein:
said seal means includes annular elastomeric and rigid sections, said rigid section being disposed between said elastomeric section and said cam members.

* * * * *